US008243585B2

(12) United States Patent
Bejerano et al.

(10) Patent No.: US 8,243,585 B2
(45) Date of Patent: Aug. 14, 2012

(54) METHOD AND APPARATUS FOR FAULT-RESILIENT MULTICAST USING MULTIPLE SOURCES

(75) Inventors: Yigal Bejerano, Springfield, NJ (US); Pramod V. Koppol, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 256 days.

(21) Appl. No.: 12/546,762

(22) Filed: Aug. 25, 2009

(65) Prior Publication Data

US 2011/0051726 A1    Mar. 3, 2011

(51) Int. Cl.
    *G01R 31/08*    (2006.01)
(52) U.S. Cl. ......... 370/217; 370/221; 370/225; 709/238
(58) Field of Classification Search ................ 370/216, 370/217, 221, 225, 228, 254; 709/238
See application file for complete search history.

(56) References Cited

U.S. PATENT DOCUMENTS

| | | | | |
|---|---|---|---|---|
| 8,050,560 | B2* | 11/2011 | Park et al. | 398/57 |
| 2004/0186701 | A1* | 9/2004 | Aubin et al. | 703/13 |
| 2004/0205239 | A1* | 10/2004 | Doshi et al. | 709/241 |
| 2005/0031339 | A1* | 2/2005 | Qiao et al. | 398/4 |
| 2005/0188100 | A1* | 8/2005 | Le Roux et al. | 709/238 |
| 2007/0211732 | A1* | 9/2007 | Suemura | 370/400 |
| 2007/0268899 | A1* | 11/2007 | Cankaya | 370/390 |
| 2010/0157794 | A1* | 6/2010 | Nakash | 370/228 |

OTHER PUBLICATIONS

"Redundant Trees for Preplanned Recovery in Arbitrary Vertex-Redundant or Edge-Redundant Graphs," by Medard, Finn, Barry, and Gallager, IEEE/ACM Transactions on Networking, vol. 7, No. 5, Oct. 1999.

"Linear Time Construction of Redundant Trees for Recovery Schemes Enhancing QOP and QOS," by Zhang, Xue, Tang, and Thulasiraman, INFOCOM 2005, 24th Annual Joint Conference of the IEEE Computer and Communications Societies, Proceedings IEEE, vol. 4, p. 2702-2710, Mar. 2005.

"The Multi-tree Approach to Reliability in Distributed Networks," by Itai and Rodeh, IEEE Symposium on Foundations of Computer Science, 1984, p. 137-147.

Bejerano and Kappol, "Optimal Construction of Redundant Multicast Trees in Directed Graphs," Infocom 2009, Apr. 19-25, 2009, Rio de Janiero, Brazil.

Cha et al., "Path Protection Routing with SRLG Constraints to Support IPTV in WDM Mesh Networks," Infocom 2009, Apr. 19-25, 2009, Rio de Janiero, Brazil.

* cited by examiner

*Primary Examiner* — Jung Park
(74) *Attorney, Agent, or Firm* — Wall & Tong, LLP

(57) ABSTRACT

A capability is provided for supporting fault-resilient multicast using multiple sources. A method for supporting fault-resilient propagation of multicast traffic using Redundant Multicast Trees (RMTs) includes identifying each potential Shared Risk Link Group (SRLG) conflict associated with a pair of RMTs providing node-disjoint paths to a plurality of destination nodes, identifying each potential SRLG conflict that is an actual SRLG conflict, and, for each actual SRLG conflict, determining a detour path for protecting the links of the actual SRLG conflict. The pair of RMTs includes a first RMT from a first multicast source node to each of the destination nodes and a second RMT from a second multicast source node to each of the destination nodes. Each potential SRLG conflict includes a plurality of links. A potential SRLG conflict is determined to be an actual SRLG conflict if first and second paths for one of the destination nodes over the respective first and second RMTs each traverse at least one link of the potential SRLG conflict.

21 Claims, 10 Drawing Sheets

200

300

700

800

METHOD AND APPARATUS FOR FAULT-RESILIENT MULTICAST USING MULTIPLE SOURCES

FIELD OF THE INVENTION

The invention relates to the field of transport networks and, more specifically but not exclusively, to providing fault-resilient propagation of traffic in transport networks.

BACKGROUND

As demand for multicast services continues to grow, service providers continue to seek low-cost, bandwidth-efficient, and fault-resilient multicast transport capabilities for supporting multicast services. In existing multicast transport networks, multicast services are provided using replication at the network edge, which causes inefficient usage of network bandwidth. In an attempt to alleviate the bandwidth inefficiency problem for multicast, many providers are proposing use of point-to-multipoint (P2MP) trees for multicast. The use of P2MP trees, however, is not sufficient to ensure fault-resilient multicast services in a transport network that has a shared risk link group (SRLG) for which failure of one link of the SRLG may cause failure of one or more other links of the SRLG. In such networks, some additional form of protection must be used to provide fault-resilient protection of the SRLGs. Disadvantageously, however, the problem of providing protection for SRLGs is quite difficult, because the problem of finding two SRLG disjoint paths from a source to a destination is NP-hard and, thus, the problem of finding two P2MP trees that provide SRLG protection also is NP-hard.

SUMMARY

Various deficiencies in the prior art are addressed by embodiments that support fault-resilient propagation of multicast traffic from multiple sources using redundant multicast trees (RMTs). In one embodiment, a method for supporting fault-resilient propagation of multicast traffic using Redundant Multicast Trees (RMTs) includes identifying each potential Shared Risk Link Group (SRLG) conflict associated with a pair of RMTs providing node-disjoint paths to a plurality of destination nodes, identifying each potential SRLG conflict that is an actual SRLG conflict, and, for each actual SRLG conflict, determining a detour path for protecting the links of the actual SRLG conflict. The pair of RMTs includes a first RMT from a first multicast source node to each of the destination nodes and a second RMT from a second multicast source node to each of the destination nodes. Each potential SRLG conflict includes a plurality of links. A potential SRLG conflict is determined to be an actual SRLG conflict if first and second paths for one of the destination nodes over the respective first and second RMTs each traverse at least one link of the potential SRLG conflict.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A fault-resilient traffic propagation capability, for use in providing fault-resilient transport of multicast traffic in transport networks, is depicted and described herein. The fault-resilient traffic propagation capability provides fault-resilient multicast from multiple source nodes, providing protection against node failures, link failures, and shared-risk-link-group (SRLG) failures. The fault-resilient traffic propagation capability may be utilized with many types of networks, such as Internet Protocol (IP)-based networks, Ethernet-based networks, and the like, as well as various combinations thereof. The fault-resilient traffic propagation capability may be used for many applications, such as Internet Protocol (IP) Television (IPTV) applications, conferencing applications (e.g., teleconferencing, video conferencing, and the like), and the like.

Figure 1:
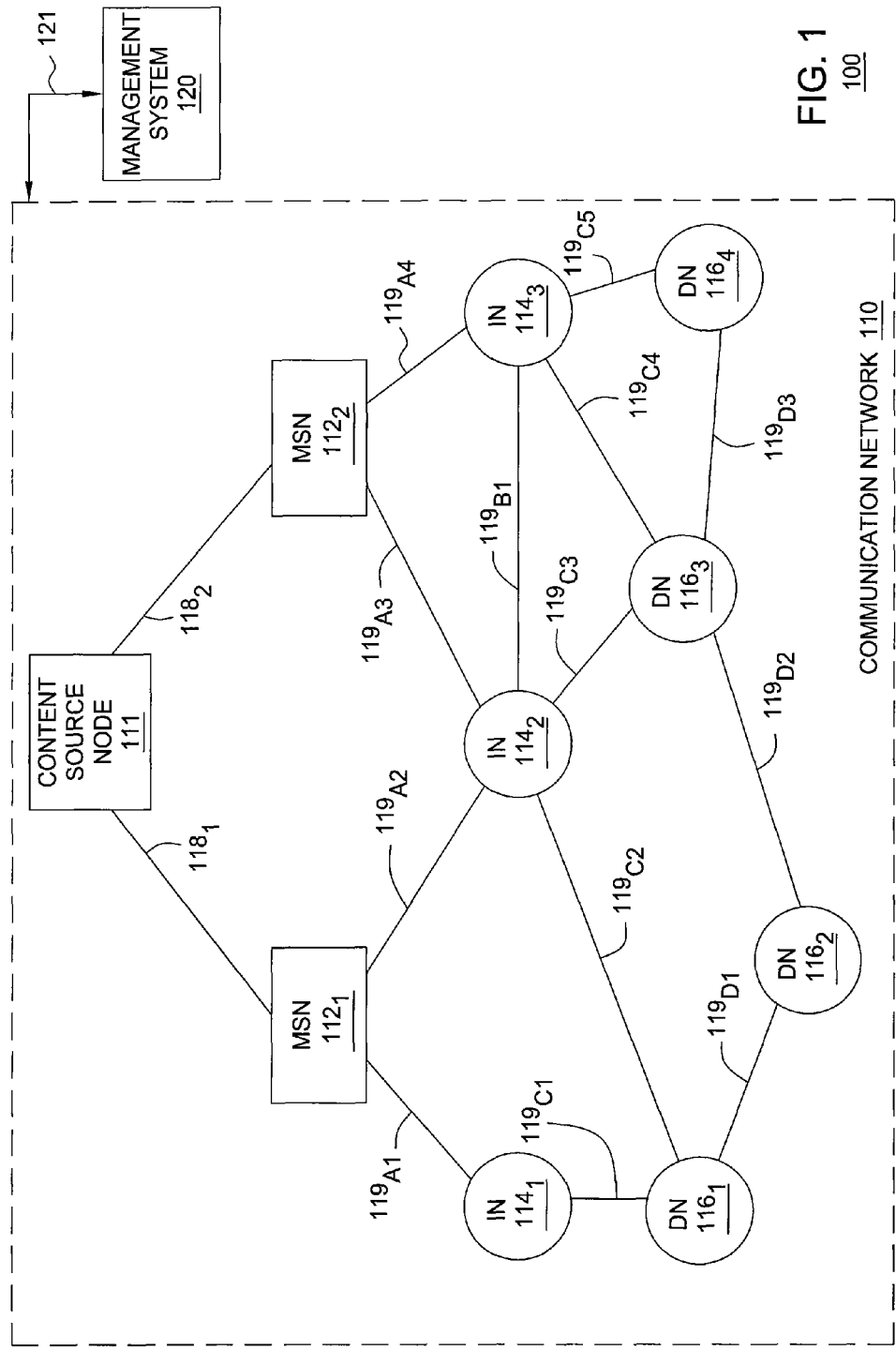
FIG. 1 depicts a high-level block diagram of a communication system.

FIG. 1 depicts a high-level block diagram of a communication system. As depicted in FIG. 1, communication system 100 includes a communication network (CN) 110 and a management system (MS) 120.

The CN 110 may be any suitable type of network, such as an IP-based transport network, an Ethernet-based transport network, and the like, as well as various combinations thereof. The CN 110 is adapted for propagating content from content sources toward destination nodes. The content may include any suitable type of content, such as text, audio, video, multimedia, and the like, as well as various combinations thereof. For example, content may include music, videos, television programs, movies, software, and the like, as well as various combinations thereof.

The CN 110 includes a content source node (CSN) 111, a pair of multicast source nodes (MSNs) $112_1$ and $112_2$ (collectively, MSNs 112), a plurality of intermediate nodes (INs) $114_1$-$114_3$ (collectively, INs 114), and a plurality of destination nodes (DNs) $116_1$-$116_4$ (collectively, DNs 116).

The CSN 111 provides content to MSNs 112, such that MSNs 112 may multicast the content toward DNs 116. The CSN 111 provides the same content to MSN $112_1$ and MSN $112_2$, such that the same content is available from both MSN $112_1$ and MSN $112_2$. The CSN 111 may store the content and/or may receive the content from one or more other content sources (omitted for purposes of clarity).

The MSNs 112 are multicast source nodes adapted for receiving a content stream from CSN 111 and multicasting the received content stream toward DNs 116 as multicast traffic. For example, MSNs 112 may include multicast servers, multicast-enabled routers, and the like.

The INs 114 receive multicast traffic from MSNs 112 and, optionally, from other INs 114. The INs 114 are adapted for propagating received multicast traffic toward DNs 116 (e.g., directly, or indirectly via other INs 114). The INs 114 also may propagate information (e.g., signaling information, feedback information, and the like) in the reverse direction from DNs 116 toward MSNs 112. For example, INs 114 may be routers, bridges, switches, and the like.

The DNs 116 receive multicast traffic from INs 114. The DNs 116 may include nodes adapted for distributing the received multicast traffic (e.g., to one or more other DNs 116, to one or more other nodes, and the like, as well as various combinations thereof) and/or presenting received multicast traffic. For example, DNs 116 may include routers, gateway nodes, user terminals (e.g., televisions, mobile phones, and the like), and the like.

As depicted in FIG. 1, network elements of CN 110 communicate using communication links. The CSN 111 and MSNs $112_1$ and $112_2$ communicate using a pair of links $118_1$ and $118_2$ (collectively, links 118) between CNS 111 and MSNs $112_1$ and $112_2$, respectively. The MSN $112_1$ and IN $114_1$ communicate using a link $119_{A1}$, the MSN $112_1$ and IN $114_2$ communicate using a link $119_{A2}$, the MSN $112_2$ and IN $114_2$ communicate using a link $119_{A3}$, and the MSN $112_2$ and IN $114_3$ communicate using a link $119_{A4}$ and links $119_{A1}$-$119_{A4}$ may be referred to collectively herein as links $119_A$. The IN $114_2$ and IN $114_3$ communicate using a link $119_B$. The IN $114_1$ and DN $116_1$ communicate using a link $119_{C1}$, the IN $114_2$ and DN $116_1$ communicate using a link $119_{C2}$, the IN $114_2$ and DN $116_3$ communicate using a link $119_{C3}$, the IN $114_3$ and DN $116_3$ communicate using a link $119_{C4}$, and the IN $114_3$ and DN $116_4$ communicate using a link $119_{C5}$ and links $119_{C1}$-$119_{C5}$ may be referred to collectively herein as links $119_C$. The DNs $116_1$ and $116_2$ communicate using a link $119_{D1}$, the DNs $116_2$ and $116_3$ communicate using a link $119_{D2}$, and the DNs $116_3$ and $116_4$ communicate using a link $119_{D3}$ and links $119_{D1}$-$119_{D3}$ may be referred to collectively herein as links $119_D$. The links $119_A$, $119_B$, $119_C$, and $119_D$ may be referred to collectively herein as links 119. The links 118 and 119 may be any suitable types of links, which may depend on the type of network being implemented. For example, the links 118 and 119 may include fiber optic links, wireless links, and the like.

As described herein, CN 110 is configured to support fault-resilient propagation of multicast content, from CSN 111 to DNs 116, which is resilient against node failures, link failures, and SRLG failures using a combination of: (1) a pair of redundant multicast trees (RMTs) and (2) one or more local detour paths. As described hereinbelow, additional protection capabilities also may be used to provide fault-resilient propagation of multicast content from CSN 111 to DNs 116 (e.g., improved RMT computation algorithms, end-to-end recovery schemes, additional traffic feeds, and the like, as well as various combinations thereof).

In general, two trees rooted at a source node r are termed RMTs if those two trees provide two node-disjoint paths from source node r to every destination node in a set of destination nodes. Two trees termed RMTs may be referred to as a pair of RMTs. A pair of RMTs computed for a source node may be said to include a first RMT and a second RMT, where the first RMT and second RMT provide a pair of node-disjoint paths from the source node to each of the destination nodes associated with the pair of RMTs. A node for which a pair of RMTs is computed is the root of the RMTs, and, thus, the pair of RMTs computed for the node are said to be rooted at that node. A pair of RMTs also may be computed such that the first RMT and second RMT are rooted at different source nodes, such that the pair of RMTs is said to be rooted at multiple source nodes. For a source node(s) having a pair of RMTs rooted thereat, under any single failure scenario (e.g., a failure of any single node, or a failure of any single link between nodes), the source node(s) is able to communicate with every destination node using at least one of the two RMTs in the pair of RMTs rooted at that source node(s). The RMTs also may be referred to as Protected Point-to-Multipoint (P2MP) trees.

A pair of RMTs rooted at a source node(s) may be computed using any suitable method for computing a pair of RMTs. For example, a pair of RMTs may be computed as described in one or more of: (a) "Redundant Trees for Pre-planned Recovery in Arbitrary Vertex-Redundant or Edge-Redundant Graphs," by Medard, Finn, Barry, and Gallager, IEEE/ACM Transactions on Networking, Vol. 7, No. 5, October 1999, which is incorporated by reference herein in its entirety; (b) "Linear Time Construction of Redundant Trees for Recovery Schemes Enhancing QOP and QOS," by Zhang, Xue, Tang, and Thulasiraman, INFOCOM 2005, 24th Annual Joint Conference of the IEEE Computer and Communications Societies, Proceedings IEEE, Vol. 4, March 2005, which is incorporated by reference herein in its entirety; and (c) "The Multi-tree Approach to Reliability in Distributed Networks," by Itai and Rodeh, IEEE Symposium on Foundations of Computer Science, 1984, which is incorporated by reference herein in its entirety. The pair of RMTs for a source node(s) may be computed using any other suitable method(s) for computing RMTs.

As an example, with respect to FIG. 1, a pair of RMTs is configured with CSN 111 as the root node and DNs 116 as the set of destination nodes, such that the pair of RMTs provides two node-disjoint paths from CSN 111 to each of the DNs 116. It will be appreciated that, since the content of CSN 111 is provided from CNS 111 to MSN $112_1$ and MSN $112_2$, the pair of RMTs may be said to be rooted at CSN 111 and also may be said to be rooted at MSNs $112_1$ and $112_2$ (i.e., with one RMT in the pair of RMTs rooted at MSN $112_1$ and the other RMT in the pair of RMTs rooted at MSN $112_2$). In this arrangement, under any single failure scenario (e.g., a failure of any single MSN 112, IN 114, or DN 116 of CN 110, or a failure of any single link 119 between nodes of CN 110), the root node CSN 111 is able to communicate with every destination node using at least one of the two RMTs in the pair of RMTs. An exemplary use of RMTs for providing fault-resilient multicast of traffic in CN 110 of FIG. 1 is depicted and described with respect to FIG. 2.

In general, a shared risk link group (SRLG) is a group of two or more links that have at least one attribute in common, such that failure of one of the links may and/or will result in failure of the other link(s) of the SRLG. The attribute common to links of a SRLG may be any type of attribute which may result in a shared risk of failure among the links of the SRLG. For example, links may be considered to be a SRLG where each of the links is included within a common fiber optic cable (e.g., such that a cut of the cable will likely result in failure of each of the fibers in the cable). For example, links may be considered to be a SRLG where each of the links terminates on a common line card in a node (e.g., such that failure of the line card will result in failure of each of the links that are associated with the line card). It will be appreciated that the basis for identifying multiple links as belonging to a SRLG may be different depending on one or more factors (e.g., based on the type of network, based on the level of risk of co-failure that is deemed to warrant grouping of links as belonging to a SRLG, and the like, as well as various combinations thereof).

In one embodiment, rather than determining and provisioning local detour paths for each potential SRLG conflict of a network, local detour paths are determined and provisioned only for actual SRLGs. In one embodiment, potential SRLG conflicts are identified and analyzed for determining which, if any, of the identified potential SRLG conflicts is an actual SRLG conflict, and local detour paths are determined and provisioned only for potential SRLGs that are determined to be actual SRLGs. This reduces the number of detour paths required in order to provide fault-resilient protection for SRLGs in a network utilizing a pair of RMTs for providing fault-resilient propagation of multicast traffic and, thus, significantly reduces the amount of network bandwidth that is consumed in order to provide fault-resilient protection in a network utilizing a pair of RMTs for providing fault-resilient propagation of multicast traffic.

More specifically, with respect to FIG. 1, potential SRLG conflicts in CN 110 are identified and analyzed for determining which of the potential SRLG conflicts, if any, is an actual SRLG conflict for which an associated local detour path should be determined and provisioned. An exemplary use of a local detour path for providing fault-resilient multicast of traffic in CN 110 of FIG. 1 is depicted and described with respect to FIG. 3.

As described herein, following determination of the pair of RMTs and one or more local detour paths for supporting fault-resilient propagation of multicast traffic (and, optionally, any additional protection capabilities to be used for supporting fault-resilient propagation of multicast traffic), information adapted for use in configuring the network for fault-resilient propagation of multicast traffic is generated and propagated to network elements of the network for configuring the network elements of the network to support fault-resilient propagation of multicast traffic. This is depicted and described herein at least with respect to FIG. 2-FIG. 7.

As further described herein, following configuration of the network using the configuration information, the network elements support fault-resilient propagation of multicast traffic between the content source node and the destination nodes. The fault-resilient propagation of multicast traffic between the content source node and the destination nodes may be provided using one or more protection capabilities, including, but not limited to: (1) for protection against failure of any non-source node and any link, multicast traffic is propagated on one or both of the RMTs in the pair of RMTs, depending on the type(s) of end-to-end traffic protection schemes used; (2) for protection against failures of links associated with SRLG conflicts: (a) determination of redundant multicast trees may be performed in a manner for minimizing the number of potential SRLG conflicts associated with the pair of RMTs, and (b) local detour paths may be determined and provisioned for protecting links of any potential SRLG conflicts that are determined to be actual SRLG conflicts; and (3) for protection against failure of a content source node or multicast source node, one or more additional traffic feed(s) may be provisioned within the network.

In order to provide protection against failure of any non-source node and any link, multicast traffic is propagated on one or both of the RMTs in the pair of RMTs, depending on the type(s) of end-to-end traffic protection scheme(s) employed in the network. A first traffic protection scheme which may be used is 1+1 protection, in which traffic is propagated over both of the RMTs of the RMT pair (i.e., over both an active RMT and a backup RMT of the RMT pair), such that the traffic may be selected at the receiver from either the active RMT or the backup RMT. A second traffic protection scheme which may be used is 1:1 protection, in which one RMT in the RMT pair is designated as an active RMT and the other RMT in the RMT pair is designated as a backup RMT, and in which traffic is propagated over the active RMT in the absence of a failure condition and traffic is propagated over both the active RMT and the backup RMT in the presence of a failure condition. It will be appreciated that one or more other traffic protection schemes may be used, either in place of or in addition to 1+1 and/or 1:1 protection. It also will be appreciated that signaling of failure condition information in the network may be performed using any suitable method of signaling failure condition information.

In order to provide protection against failures of links associated with SRLG conflicts: (a) determination of redundant multicast trees may be performed in a manner for minimizing the number of potential SRLG conflicts associated with the pair of RMTs (as depicted and described with respect to FIG. 2 and FIG. 5), and (b) local detour paths may be determined and provisioned for protecting the links of any potential SRLG conflicts that are determined to be actual SRLG conflicts (as depicted and described with respect to FIG. 2-FIG. 7).

Figure 9:
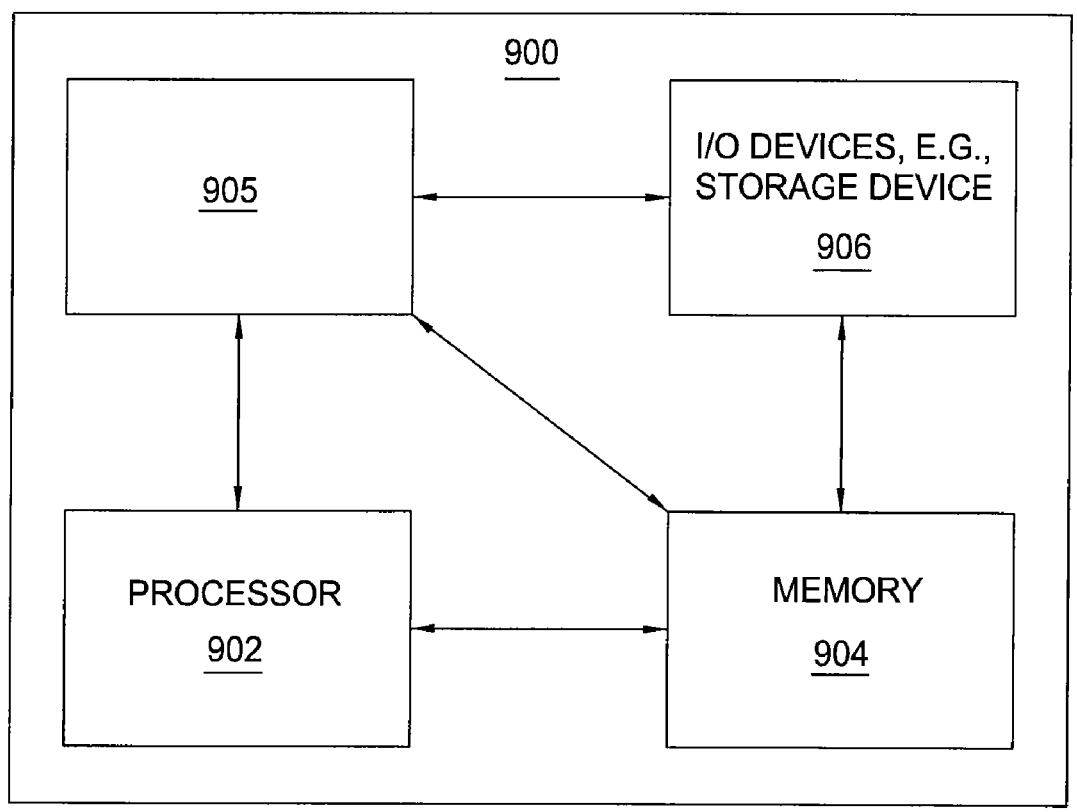
FIG. 9 depicts a high-level block diagram of a general-purpose computer suitable for use in performing the functions described herein.

In order to provide protection against failure of a content source node or multicast source node, one or more additional traffic feed(s) may be provisioned within the network (as depicted and described with respect to FIG. 9).

The MS 120 is a management system providing management functions for CN 110. In one embodiment, MS 120 is configured to determine a network configuration for use in multicasting content from CSN 111 to DNs 116, and, further, is configured to provision CN 110 to support the determined network configuration for use in multicasting content from CSN 111 to DNs 116. As described herein, in one embodiment, the network configuration may include the pair of RMTs and one or more associated local detour paths for providing fault-resilient multicast of content from CSN 111 to DNs 116. The MS 120 also may perform any other suitable management functions for CN 110 (e.g., other network provisioning functions, network monitoring functions, network management functions, and the like, as well as various combinations thereof).

The MS 120 communicates with CN 110 for purposes of performing the management functions. The MS 120 may communicate with CN 110 for purposes of receiving information from CN 110 (e.g., network topology information, network status information, and the like) and/or for purposes of providing information to CN 110 (e.g., network configuration information and, optionally, any other suitable information). The MS 120 may be configured to communicate with some or all of the network elements of CN 110 for these purposes. As depicted in FIG. 1, MS 120 communicates with CN 110 via a communication path 121. The MS 120 may communicate with network elements of CN 110 using links 118 and/or 119 and/or any other suitable communications paths (omitted for purposes of clarity).

Although primarily depicted and described with respect to providing the fault-resilient traffic propagation capability using specific numbers, types, and arrangements of CSNs, MSNs, INs, DNs, MSs, and CLs, it will be appreciated that the fault-resilient traffic propagation capability may be provided using other numbers, types, and/or arrangements of CSNs, MSNs, INs, DNs, MSs, and/or CLs. Although primarily described herein as providing specific functions (for purposes of clarity in describing the fault-resilient traffic propagation capability), it will be appreciated that one or more of the different network element types (e.g., CSNs, MSNs, INs, DNs, MSs, and the like) may support other general and/or specific capabilities as needed and/or desired. Although primarily depicted and described herein as being directly connected, it will be appreciated that, in some embodiments, some or all of the network elements may not be directly connected (e.g., such as where the depicted network elements are indirectly connected via other elements). Although primarily depicted and described herein with respect to use of intermediate nodes, it will be appreciated that, in some embodiments, all of the nodes which receive multicast streams from multicast source nodes are considered to be destination nodes for purposes of ensuring fault-resilient propagation of multicast traffic.

Figure 2:
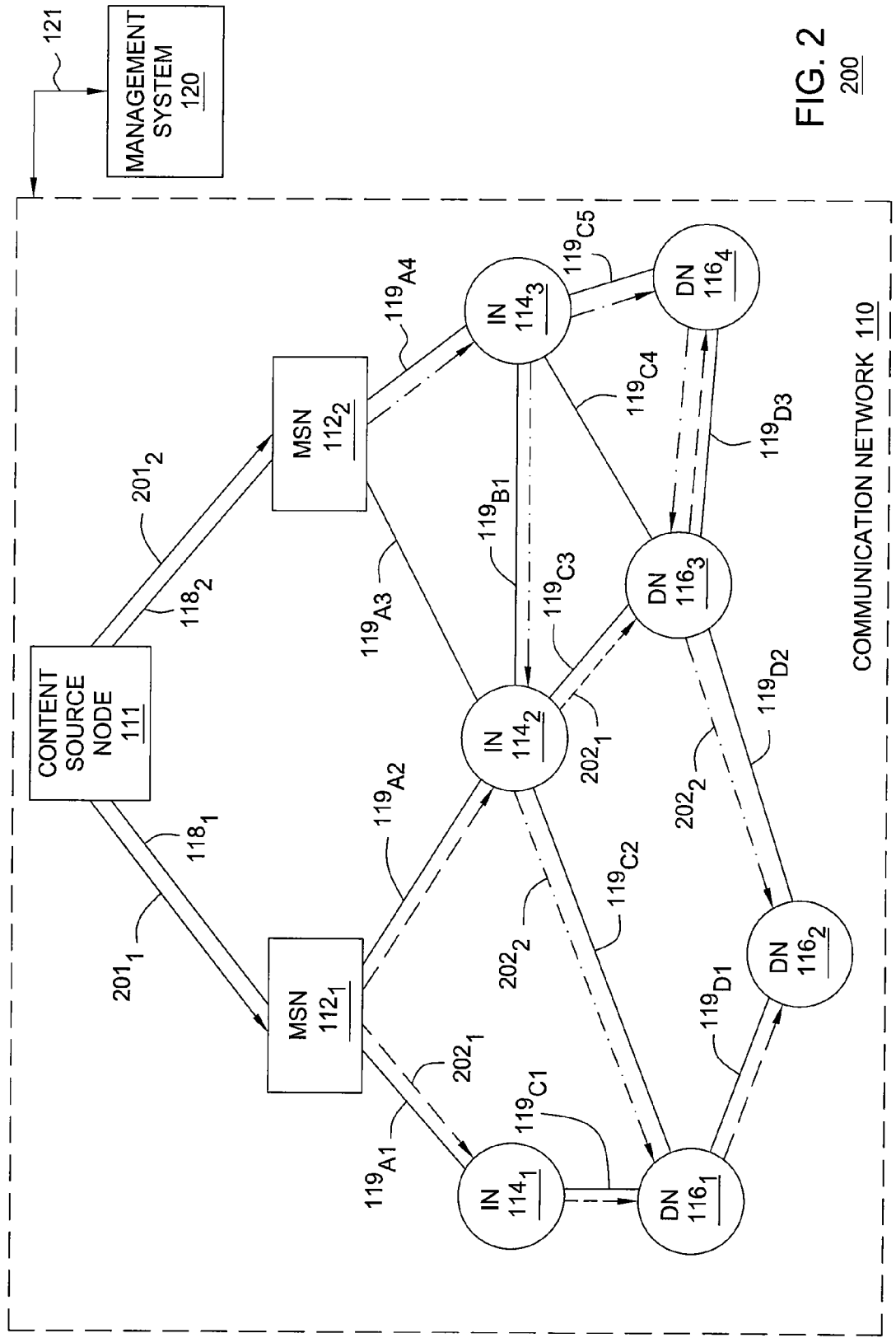
FIG. 2 depicts the communication network of FIG. 1, illustrating a pair of RMTs for the pair of multicast source nodes of the communication system of FIG. 1.
Figure 3:
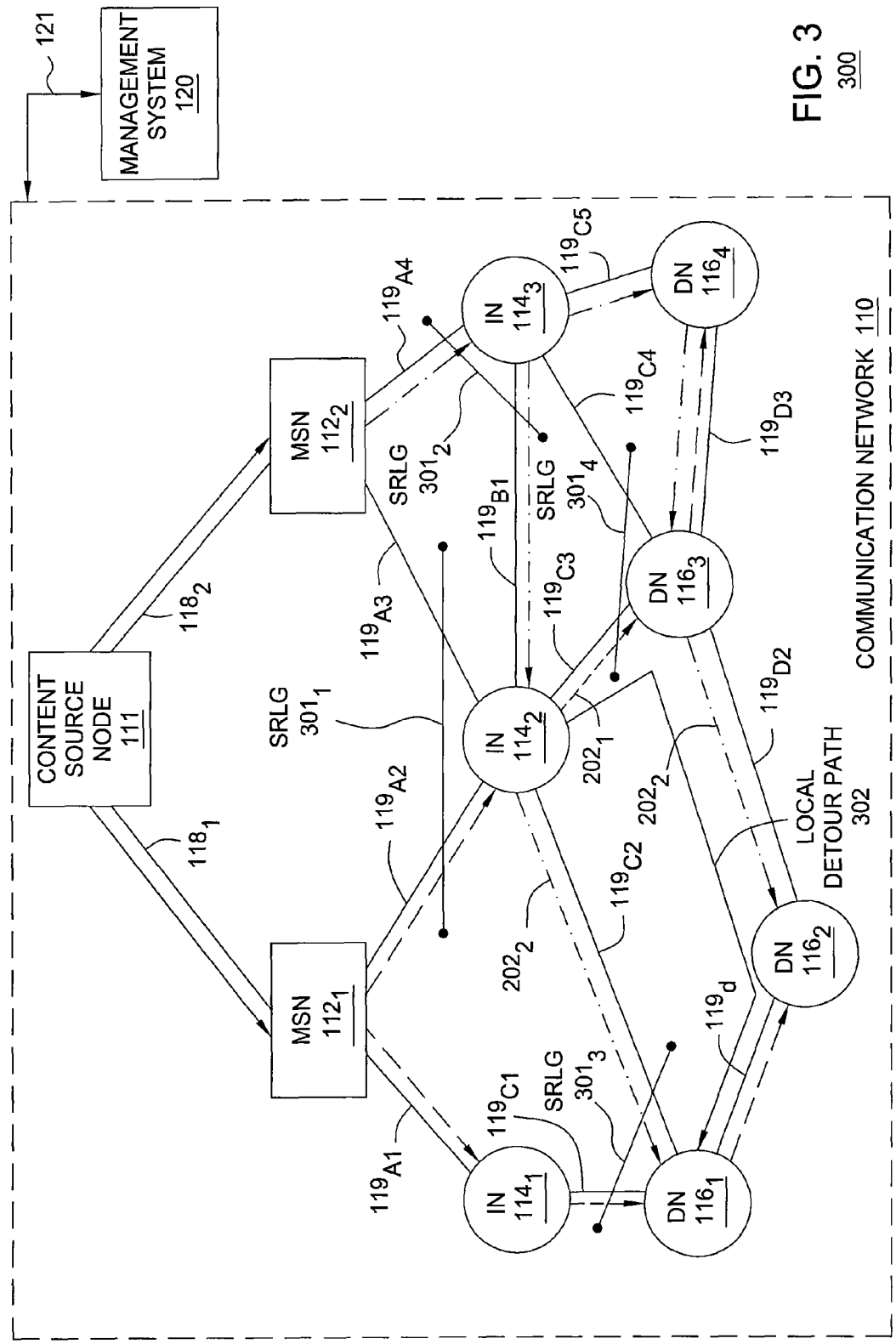
FIG. 3 depicts the communication network of FIG. 1, illustrating potential SRLG conflicts for the communication system of FIG. 1.

The use of RMTs and local detour paths for propagating multicast traffic in transport networks may be better understood by way of reference to the exemplary pair of RMTs depicted and described herein with respect to FIG. 2 and the exemplary local detour path depicted and described herein with respect to FIG. 3.

FIG. 2 depicts the communication network of FIG. 1, illustrating a pair of RMTs for the pair of multicast source nodes of the communication system of FIG. 1.

As depicted in FIG. 2, a pair of content distribution paths 201 is established for use in providing content from CSN 111 to MSN $112_1$ and MSN $112_2$. The pair of content distribution paths 201 includes first and second content distribution paths $201_1$ and $201_2$ from CSN 111 to MSN $112_1$ and MSN $112_2$, respectively. This enables the content to be multicasted to be made available to both MSN $112_1$ and MSN $112_2$, such that the content may then be multicasted to each of the DNs 116 with fault-resilience.

As further depicted in FIG. 2, a pair of RMTs 202 is computed for MSN $112_1$ and MSN $112_2$. The pair of RMTs 202 includes a first RMT $202_1$ rooted at MSN $112_1$ and a second RMT $202_2$ rooted at MSN $112_2$ (and it will be appreciated that, due to content distribution paths 201, the first RMT $202_1$ and the second RMT $202_2$ also may be considered to be rooted at CSN 111). The first RMT $202_1$ includes the following links: $119_{A1}$, $119_{A2}$, $119_{C1}$, $119_{C3}$, $119_{D1}$, and $119_{D3}$. The second RMT $202_2$ includes the following links: $119_{A4}$, $119_{B1}$, $119_{C2}$, $119_{C5}$, $119_{D2}$, and $119_{D3}$.

In this arrangement, every DN 116 is reachable from MSN $112_1$ via first RMT $202_1$ and from MSN $112_2$ via second RMT $202_2$, over two node-disjoint paths from MSNs 112 to each of the DN 116, and, thus, every DN 116 is provided multicast service that is resilient against both node failures and link failures. For example, the path from MSN $112_1$ to DN $116_1$ on first RMT $202_1$ follows the path MSN $112_1 \rightarrow$ IN $114_1 \rightarrow$ DN $116_1$, and the path from MSN $112_2$ to DN $116_1$ on second RMT $202_2$ follows the path MSN $112_2 \rightarrow$ IN $114_3 \rightarrow$ IN $114_2 \rightarrow$ DN $116_1$, such that the paths from CSN 111 to DN $116_1$ on first RMT $202_1$ and second RMT $202_2$ do not share any links or nodes between CSN 111 and DN $116_1$, and, thus, are disjoint. This holds true for paths from CSN 111 to each of the other destination nodes in CN 110 (i.e., DNs $116_2$-$116_4$).

As described herein, where CSN 111 is operating as a source of multicast traffic to be delivered to each of the DNs 116, one or both of the first RMT $202_1$ and the second RMT $202_2$ may be used to propagate multicast traffic from root node CSN 111 to each of the DNs 116.

If 1+1 protection is used for multicast traffic, MSN $112_1$ and MSN $112_2$ multicast the content as multicast traffic on both the first RMT $202_1$ and the second RMT $202_2$, respectively, such that each of the DNs 116 can receive the multicast traffic on either first RMT $202_1$ or second RMT $202_2$, depending on whether there is a failure condition in the network.

If 1:1 protection is used for multicast traffic, MSN $112_1$ and MSN $112_2$ initially only transmit the multicast traffic on an active RMT (i.e., either MSN $112_1$ multicasts the content via first RMT $202_1$ or MSN $112_2$ multicasts the content via second RMT $202_2$, depending on which one is active). If there is a failure condition in the network, MSN $112_1$ and MSN $112_2$ then begin transmitting the multicast traffic on both the active RMT and the backup RMT (i.e., on both first RMT $202_1$ and second RMT $202_2$) until the failure condition is resolved.

Thus, as depicted in FIG. 2, a pair of RMTs may be utilized to provide fault-resilient propagation of multicast traffic to destination nodes in a manner for protecting against both node failures and link failures. As described herein, however, even where a pair of RMTs is utilized to multicast traffic from a source to multiple destination nodes, the existence of SRLG conflicts within the network might prevent traffic from being received at one or more of the destination nodes The use of local detour paths for protecting against SRLG failures is depicted and described herein with respect to FIG. 3-FIG. 7.

FIG. 3 depicts the communication network of FIG. 1, illustrating potential SRLG conflicts for the communication system of FIG. 1.

As depicted in FIG. 3, there are four potential SRLG conflicts in CN 110: (1) a first potential SRLG conflict $301_1$ including links $119_{A2}$ and $119_{A3}$; (2) a second potential SRLG conflict $301_2$ including links $119_{A4}$ and $119_{B1}$; (3) a third potential SRLG conflict $301_3$ including links $119_{C1}$ and $119_{C2}$; and (4) a fourth potential SRLG conflict $301_4$ including links $119_{C3}$ and $119_{C4}$.

In one embodiment, the potential SRLG conflicts are analyzed for determining which, if any, of the potential SRLG conflicts is an actual SRLG conflict, and local detour paths are determined and provisioned only for the actual SRLG conflicts.

In one embodiment, a potential SRLG conflict is determined to be an actual SRLG conflict if paths between the source nodes of the first and second RMTs and one of the destination nodes traverse links of the same potential SRLG.

As depicted in FIG. 3, only one of the four potential SRLG conflicts is identified as being an actual SRLG conflict, namely, the third potential SRLG conflict $301_3$ including links $119_{C1}$ and $119_{C2}$.

The first potential SRLG conflict $301_1$ is not identified as an actual SRLG conflict because, for each of the DNs 116, paths between the MSNs $112_1$ and $112_2$ and the respective DN 116 do not traverse any links 119 that belong to the same potential SRLG. For DN 116, for example, neither of the paths between the MSNs 112 and DN $116_1$ traverses any of the links of the first potential SRLG conflict $301_1$. For DN $116_2$, for example, neither of the paths between the MSNs 112 and DN $116_2$ traverses any of the links of the first potential SRLG conflict $301_1$. For DN $116_3$, for example, only the path between MSN $112_1$ and DN $116_1$ traverses one of the links in first potential SRLG conflict $301_1$. For DN $116_4$, for example, only the path between MSN $112_1$ and DN $116_1$ traverses one of the links in first potential SRLG conflict $301_1$.

The second potential SRLG conflict $301_2$ is not identified as an actual SRLG conflict because, for each of the DNs 116, paths between the MSNs $112_1$ and $112_2$ and the respective DN 116 do not traverse any links 119 that belong to the same potential SRLG.

The third potential SRLG conflict $301_3$ is identified as an actual SRLG conflict because paths between MSNs $112_1$ and $112_2$ and DN $116_1$ traverse links 119 of the same potential SRLG (illustratively, a first path between MSN $112_1$ and DN $116_1$ over first RMT $202_1$ traverses link $119_{C1}$ to reach DN 1161 a second path between MSN $112_2$ and DN $116_1$ over second RMT $202_2$ traverses link $119_{C2}$ to reach DN $116_1$, and links $119_{C1}$ and $119_{C2}$ belong to the same potential SRLG conflict $301_3$).

The fourth potential SRLG conflict $301_4$ is not identified as an actual SRLG conflict because, for each of the DNs 116, paths between the MSNs $112_1$ and $112_2$ and the respective DN 116 do not traverse any links 119 that belong to the same potential SRLG.

Figure 6:
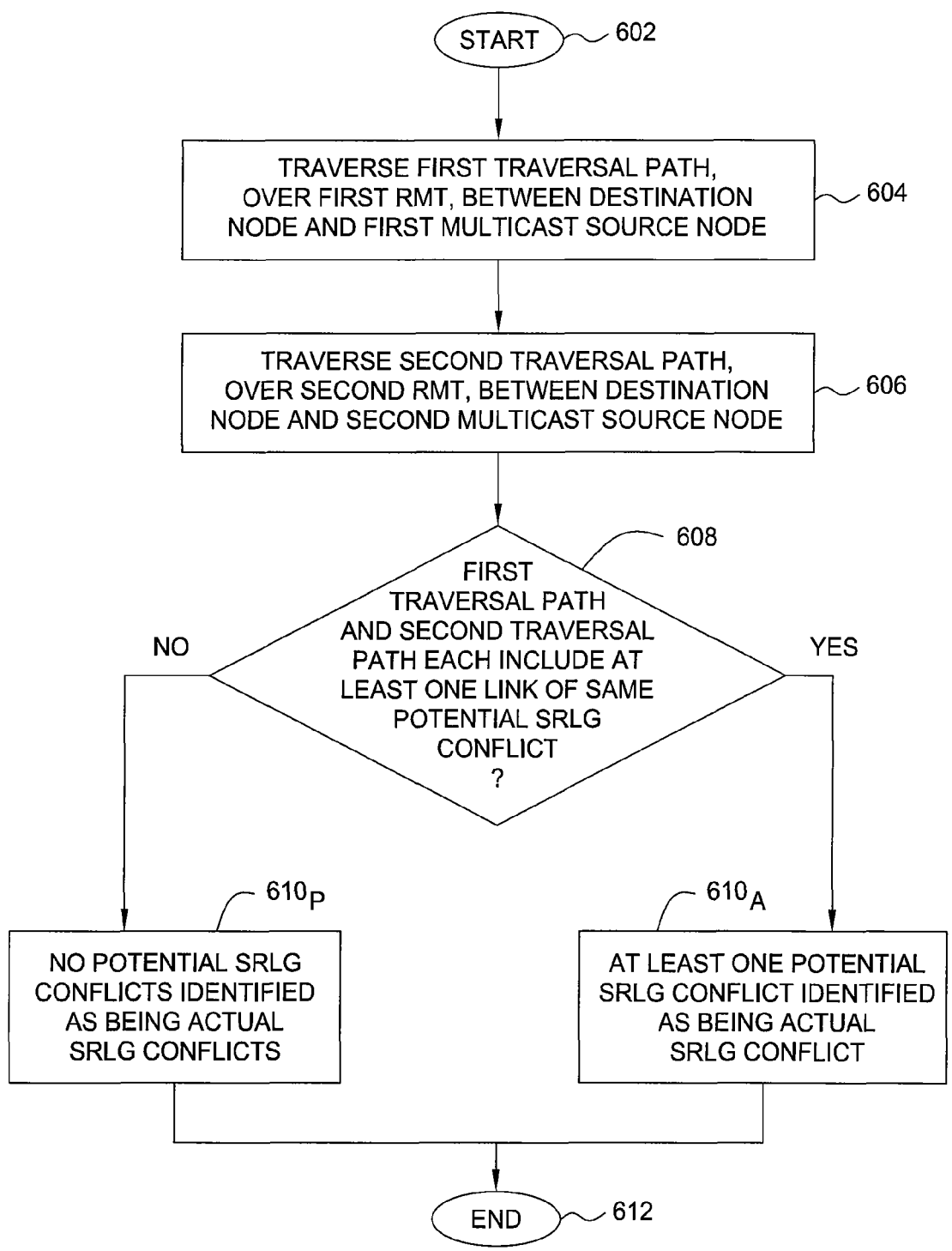
FIG. 6 depicts one embodiment of a method for determining which potential SRLG conflicts are actual SRLG conflicts

A method for determining which potential SRLG conflicts are actual SRLG conflicts is depicted and described herein with respect to FIG. 6.

In one embodiment, local detour paths are determined and provisioned for protecting links associated with actual SRLG conflicts (but not for potential SRLG conflicts that are not determined to be actual SRLG conflicts). In one such embodiment, when a potential SRLG conflict is identified as an actual SRLG conflict, a local detour path is determined and provisioned in a manner for protecting the links of the actual SRLG conflict. A local detour path may be any suitable type of path, which may depend, at least in part, on the type of transport network. For example, local detour paths may be label switched paths (LSPs), fast reroute (FRR) paths, and the like, as well as various combinations thereof.

As depicted in FIG. 3, only one of the four potential SRLG conflicts is identified as being an actual SRLG conflict, namely, the third potential SRLG conflict $301_3$ including links $119_{C1}$ and $119_{C2}$. As a result, a local detour path is determined for protecting the links of the third potential SRLG conflict $301_3$, namely, links $119_{C1}$ and $119_{C2}$. As depicted in FIG. 3, a local detour path 302 is provisioned from IN $114_2$ to DN $116_1$ via links $119_{C3}$, $119_{D2}$, and $119_{D1}$. The provisioning of local detour path 302 provides fault-resilient protection for DN $116_1$ by ensuring that even if links $119_{C1}$ and $119_{C2}$ both fail as a result of their association with third SRLG $301_3$, the multicast traffic still can be provided to DN $116_1$ via local detour path 302 because IN $114_2$ receives the multicast traffic on both the first RMT $202_1$ (directly from MSB $112_1$) and the second RMT $202_2$ (from MSN $112_2$ via IN $114_3$).

In this manner, by only provisioning local detour paths for actual SRLG conflicts (rather than approaches in which local detour paths are configured for each potential SRLG conflict) the number of local detour paths that must be configured in order to provide fault-resilient multicast is reduced, thereby reducing consumption of network bandwidth.

Figure 4:
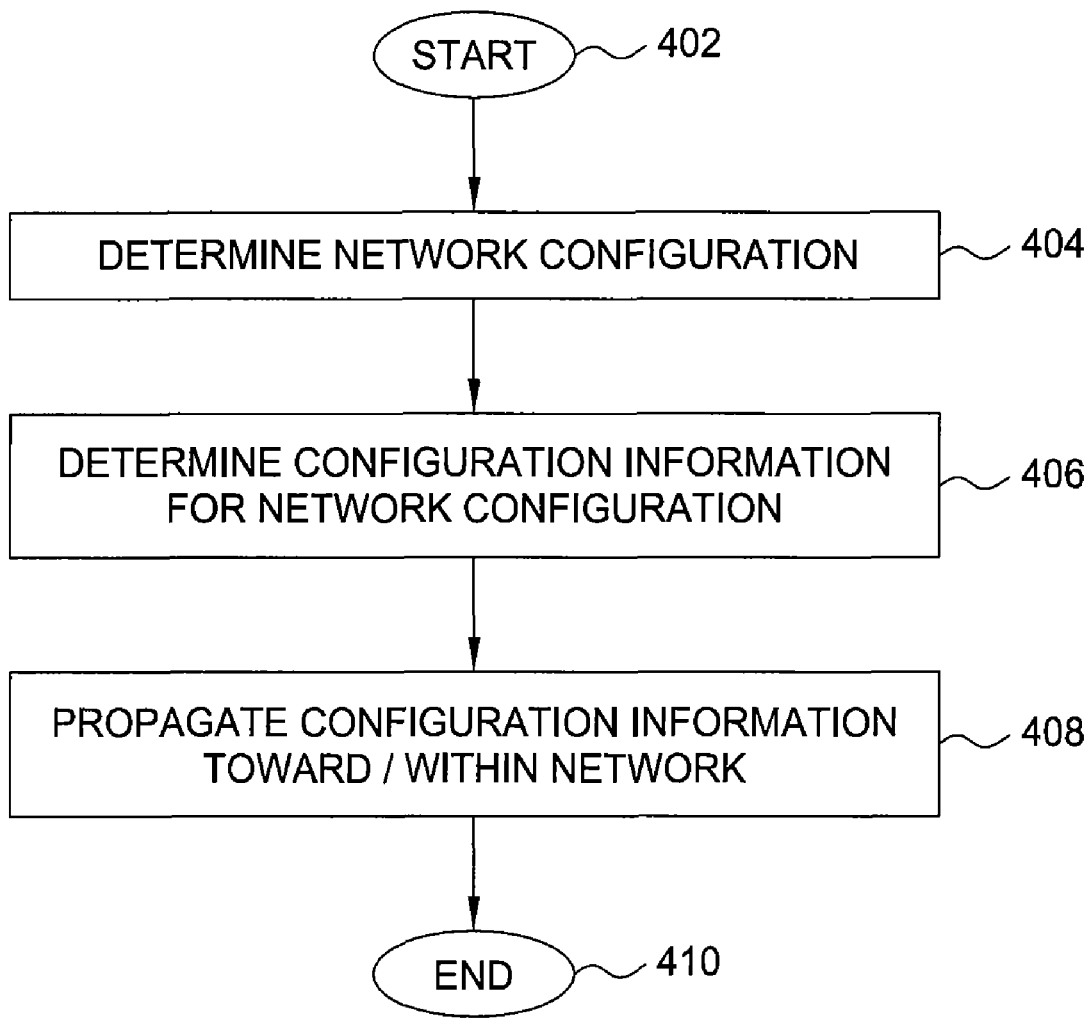
FIG. 4 depicts one embodiment of a method for configuring a set of network elements in a manner for providing fault-resilient propagation of multicast traffic from two multicast source nodes.

FIG. 4 depicts one embodiment of a method for configuring a set of network elements in a manner for providing fault-resilient propagation of multicast traffic from two multicast source nodes. Although primarily depicted and described herein as being performed serially, at least a portion of the steps of method 400 may be performed contemporaneously, or in a different order than depicted and described with respect to FIG. 4.

At step 402, method 400 begins.

At step 404, a network configuration is determined. The network configuration includes: (1) a pair of RMTs determined for providing node-disjoint paths from the multicast sources to each of the destination nodes, and (2) one or more local detour paths determined for one or more potential SRLG conflicts determined to be actual SRLG conflicts. In one embodiment, the network configuration is determined as depicted and described with respect to FIG. 5.

At step 406, configuration information is determined. The configuration information includes information adapted for use in establishing the determined network configuration within the network. The configuration information may be determined in any suitable manner and may be represented in any suitable format. For example, the configuration information may include identification information for identifying the RMTs in the pair of RMTs, entries for routing tables, link weights, and the like, as well as various combinations thereof.

At step 408, the configuration information is propagated toward/within the network for provisioning the network to support the determined network configuration. The configuration information may be propagated toward/within the network in any suitable manner (e.g., using any suitable communication protocols, communication messaging formats, and the like, as well as various combinations thereof).

At step 410, method 400 ends.

As described herein, method 400 of FIG. 4 may be performed in a centralized or distributed manner. In one embodiment in which method 400 is performed in a centralized manner, for example, the steps of method 400 may be performed by a management system (e.g., MS 120 of FIG. 1). In one embodiment in which method 400 is performed in a distributed manner, for example, the steps of method 400 may performed by the multicast sources (e.g., MSNs 112 of FIG. 1), network elements participating in the RMTs (e.g., one or more of INs 114 and/or DNs 114), and the like, as well as various combinations thereof. It will be appreciated that method 400 of FIG. 4 may be performed centrally by any other suitable element or may be performed in a distributed manner using various other combinations of network elements.

Figure 5:
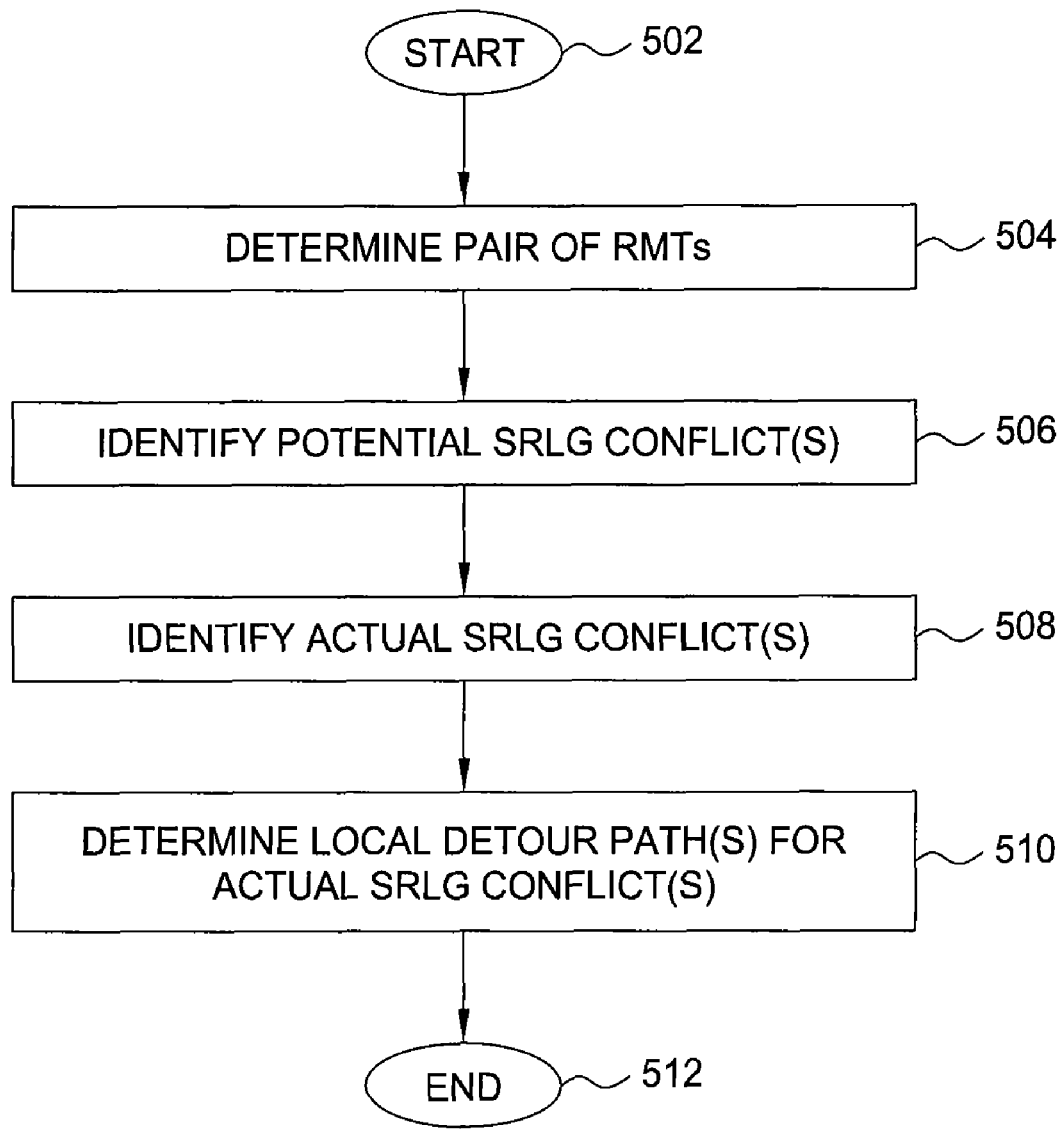
FIG. 5 depicts one embodiment of a method for determining a network configuration for supporting fault-resilient propagation of multicast traffic from multiple source nodes using a pair of redundant multicast trees and one or more local detour paths.

FIG. 5 depicts one embodiment of a method for determining a network configuration for supporting fault-resilient propagation of multicast traffic from multiple source nodes using a pair of redundant multicast trees and one or more local detour paths. Although primarily depicted and described herein as being performed serially, at least a portion of the steps of method 500 may be performed contemporaneously, or in a different order than depicted and described with respect to FIG. 5.

At step 502, method 500 begins.

At step 504, a pair of redundant multicast trees is determined. The pair of RMTs includes a first RMT rooted at a first one of the source nodes and a second RMT rooted at a second one of the source nodes. The pair of RMTs may be determined in any suitable manner.

At step 506, one or more potential SRLG conflicts are identified. The potential SRLG conflict(s) may be identified in any suitable manner. In one embodiment, a list of potential SRLG conflict(s) is available to the network element performing method 500. In one embodiment, the potential SRLG conflict(s) may be identified on-the-fly by the network element performing method 500 (or by another network element and provided to the network element performing method 500).

At step 508, one or more actual SRLG conflicts are identified. An actual SRLG conflict is identified by determining that a potential SRLG conflict is an actual SRLG. As described herein, a potential SRLG conflict is determined to be an actual SRLG conflict if paths between the source nodes of the first and second RMTs and one of the destination nodes each traverse at least one link of the same potential SRLG. In one embodiment, the determination as to whether paths between the source nodes of first and second RMTs and one of the destination nodes traverse links of the same potential SRLG, such that the potential SRLG is identified as being an actual SRLG, is determined using information associated with the pair of RMTs (e.g., configuration of the RMTs in the pair of RMTs within the network, as determined in step 504) and information associated with the potential SRLG (e.g., a list of the links of the SRLG). In one embodiment, actual SRLG conflicts may be determined as depicted and described with respect to FIG. 6 and/or FIG. 7.

At step 510, for each potential SRLG that is identified as being an actual SRLG, an associated local detour path is determined. The local detour path for an actual SRLG protects each of the links of the actual SRLG and, thus, does not include any of the links of the actual SRLG.

At step 512, method 500 ends.

With respect to FIG. 5, for purposes of clarity in describing a method for determining a network configuration enabling fault-resilient propagation of multicast traffic using a pair of RMTs and one or more local detour paths, an assumption was made for method 500 that at least one potential SRLG is identified and that at least one potential SRLG is determined to be an actual SRLG. It will be appreciated that, in some cases, either no potential SRLG will be identified, or, if one or more potential SRLGs is identified, none of the potential SRLGs will be identified as being an actual SRLG for which a local detour path should determined and provisioned. In such cases, the RMTs will be sufficient to support fault-resilient propagation of multicast traffic from the multicast source nodes to the destination nodes. As such, in one embodiment, for example, method 500 may be modified such that: (a) after the RMTs are computed, a determination is made as to whether there are any potential SRLGs; (b) if there are no potential SRLGs, the method ends without determining any local detour paths; (c) if there is at least one potential SRLG, a determination is made as to whether any of the potential SRLGs is an actual SRLG; (d) if there are no actual SRLGs, the method ends without determining any local detour paths; and (e) if there is at least one actual SRLG, one or more local detour paths are determined as described with respect to step 510. It will be appreciated that method 500 may be modified in any manner suitable for supporting the fault-resilient traffic propagation capability depicted and described herein.

FIG. 6 depicts one embodiment of a method for determining which potential SRLG conflicts are actual SRLG conflicts. Although depicted and described with respect to being performed for one destination node, it will be appreciated that method 600 may be repeated for each destination node in order to determine which of the potential SRLG conflicts, if any, are actual SRLG conflicts. Although depicted and described herein as being performed serially, at least a portion of the steps of method 600 may be performed contemporaneously, or in a different order than depicted and described with respect to FIG. 6.

At step 602, method 600 begins.

At step 604, a first traversal path is traversed between the destination node and a first multicast source node. The first traversal path is traversed over the first RMT. The first traversal path includes all of the links between the destination node and the first multicast source node on the first RMT. The first RMT may be traversed in either direction.

At step 606, a second traversal path is traversed between the destination node and a second multicast source node. The second traversal path is traversed over the second RMT. The second traversal path includes all of the links between the destination node and the second multicast source node on the second RMT. The second RMT may be traversed in either direction.

At step 608, a determination is made as to whether the first and second traversal paths each include at least one link of the same potential SRLG conflict.

Figure 7:
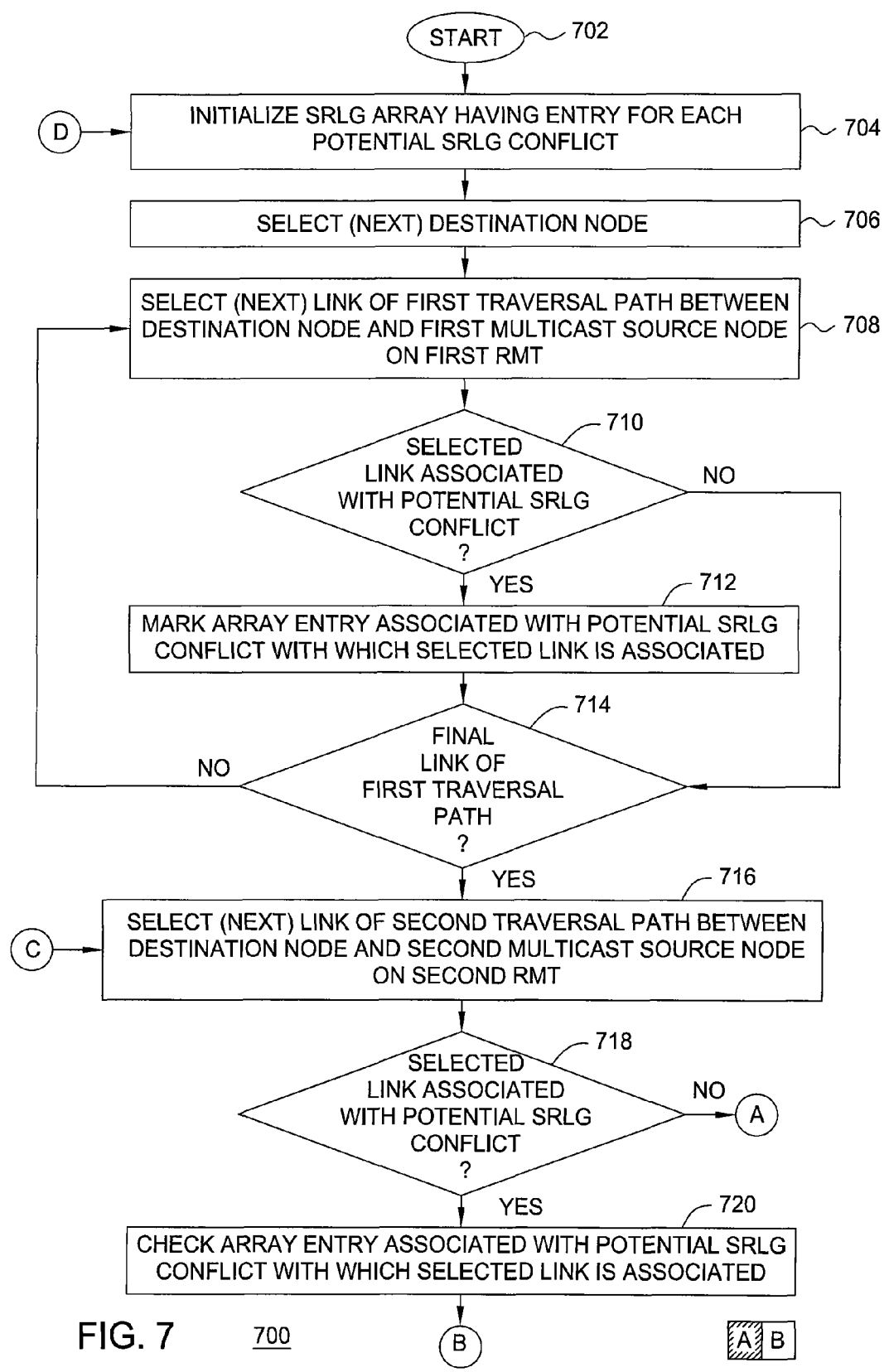
FIG. 7 depicts one embodiment of a method for determining which potential SRLG conflicts are actual SRLG conflicts.
Figure 7:
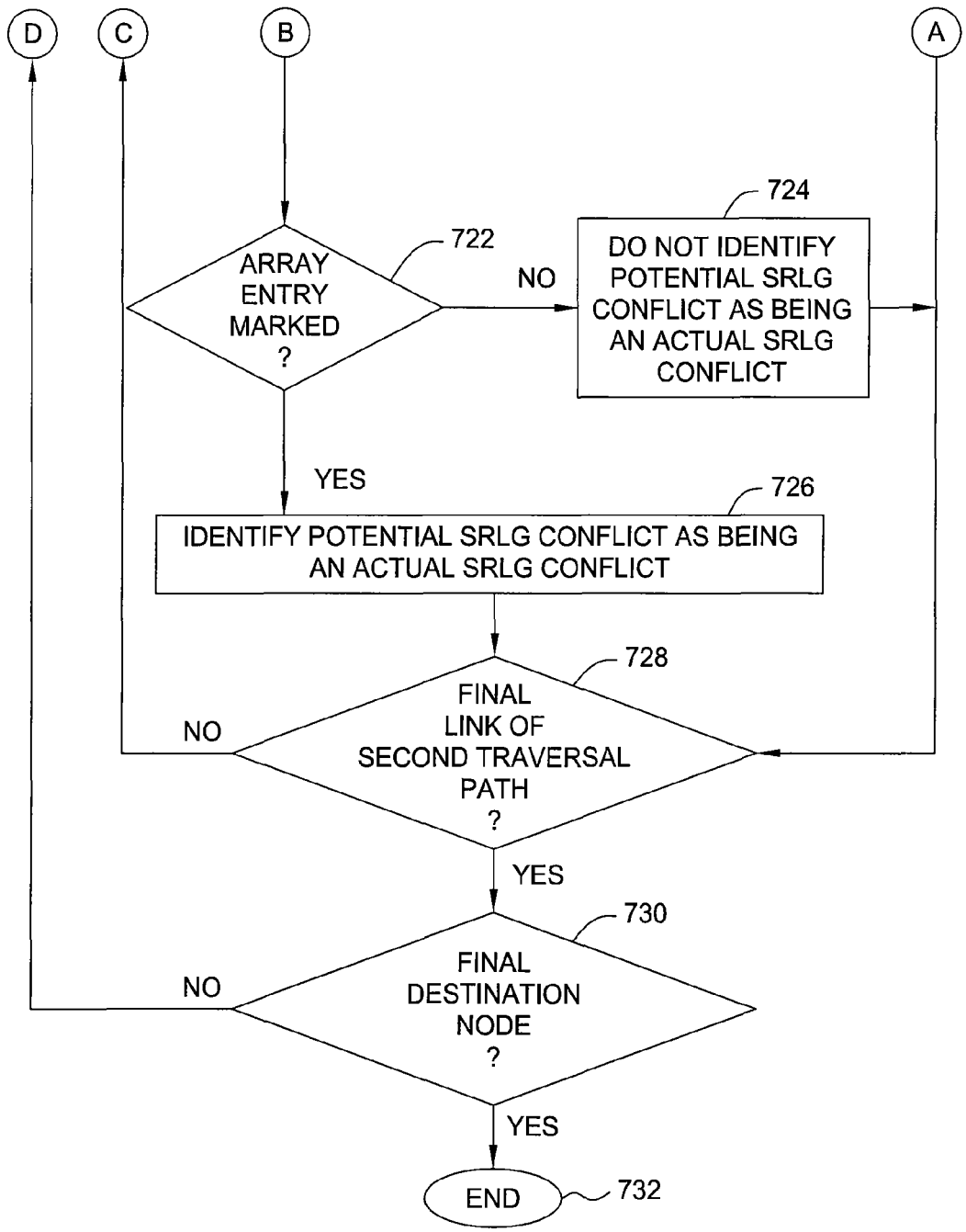

At step 610P, if the first and second traversal paths do not traverse at least one link of the same potential SRLG conflict, a determination is made that none of the potential SRLG conflicts is identified as being an actual SRLG conflict for that destination node (although any of the potential SRLG conflicts still may be identified as being an actual SRLG conflict when method 600 is performed for other destination nodes, as will be understood at least by way of reference to FIG. 7).

At step 610A, if the first and second traversal paths each traverse at least one link of the same potential SRLG conflict, at least one of the potential SRLG conflicts is identified as being an actual SRLG conflict (regardless of the result when method 600 is performed for other destination nodes, as will be understood at least by way of reference to FIG. 7). The at least one potential SRLG conflict identified as being an actual SRLG conflict includes each of the potential SRLG conflicts for which the first and second traversal paths each traverse at least one link of the same potential SRLG conflict (which may be one or more of the potential SRLG conflicts).

From steps 610P and 610A, method 600 proceeds to step 612, where method 600 ends.

Although depicted and described as ending (for purposes of clarity), it will be appreciated that one or more other steps may be performed (e.g., storing information identifying a potential SRLG conflict(s) identified as being an actual SRLG conflict(s) for later use in determining and provisioning local detour path(s), or any other similar suitable actions).

Although depicted and described as ending (for purposes of clarity), it will be appreciated that method 600 may be repeated for other destination nodes for purposes of determining which potential SRLG conflicts are actual SRLG conflicts.

The method 600 of FIG. 6 may be performed during initial configuration of the network (e.g., when a pair of RMTs is initially determined) and/or during subsequent reconfiguration of the network (e.g., when new destination nodes are added to and/or when existing destination nodes are removed from the multicast distribution stream). In one embodiment, in which method 600 is performed during initial configuration of the network, method 600 may be performed for each of the destination nodes. In one embodiment, in which method 600 is performed during subsequent reconfiguration of the network, method 600 may be performed for each of the destination nodes or for a subset of the destination nodes (e.g., for determining whether any previously identified potential SRLG conflicts not determined to be actual SRLG conflicts are now actual SRLG conflicts, for determining whether any previously identified potential SRLG conflicts determined to be actual SRLG conflicts are no longer actual SRLG conflict, for identifying new potential SRLG conflicts and determining whether any of the new potential SRLG conflicts is an actual SRLG conflict, and the like, as well as various combinations thereof).

FIG. 7 depicts one embodiment of a method for determining which potential SRLG conflicts are actual SRLG conflicts. Although depicted and described with respect to being performed for multiple destination nodes, it will be appreciated that method 700 may be performed for a single destination node. Although primarily depicted and described herein as being performed serially, at least a portion of the steps of method 700 may be performed contemporaneously, or in a different order than depicted and described with respect to FIG. 7.

At step 702, method 700 begins.

At step 704, an SRLG array is initialized. The SRLG array is initialized to include one entry for each potential SRLG conflict.

At step 706, a destination node is selected.

At step 708, a link of a first traversal path is selected, where the first traversal path is a path, on a first RMT, between the destination node and a first multicast source node.

At step 710, a determination is made as to whether the selected link is associated with a potential SRLG conflict. This determination may be performed in any suitable manner. For example, an identifier of the link may be used to search a list of potential SRLG conflicts to determine if the link is associated with any of the potential SRLG conflicts. If a determination is made that the selected link is not associated with a potential SRLG conflict, method 700 proceeds to step 714. If a determination is made that the selected link is associated with a potential SRLG conflict, method 700 proceeds to step 712.

At step 712, an array entry of the SRLG array, i.e., the array entry associated with the potential SRLG conflict with which the link is associated, is marked. The array entry may be marked in any suitable manner.

At step 714, a determination is made as to whether the final link of the first traversal path has been processed. If a determination is made that the final link of the first traversal path has not been processed, method 700 returns to step 708, at which point the next link of the first traversal path is selected for processing. If a determination is made that the final link of the first traversal path has been processed, processing of the first traversal path is complete and method 700 proceeds to step 716.

At step 716, a link of a second traversal path is selected, where the second traversal path is a path, on a second RMT, between the destination node and a second multicast source node.

At step 718, a determination is made as to whether the selected link is associated with a potential SRLG conflict. This determination may be performed in any suitable manner. For example, an identifier of the link may be used to search a list of potential SRLG conflicts to determine if the link is associated with any of the potential SRLG conflicts. If a determination is made that the selected link is not associated with a potential SRLG conflict, method 700 proceeds to step 728. If a determination is made that the selected link is associated with a potential SRLG conflict, method 700 proceeds to step 720.

At step 720, an array entry of the SRLG array, i.e., the array entry associated with the potential SRLG conflict with which the link is associated, is checked. The array entry is checked to determine whether or not the array entry was marked during the processing on the first traversal path (i.e., during steps 708-714 of method 700).

At step 722, a determination is made as to whether the array entry is marked. If the array entry is not marked, the potential SRLG conflict associated with the selected link/array entry is not identified as being an actual SRLG conflict (at step 724), and method 700 proceeds from step 724 to step 728. If the array entry is marked, the potential SRLG conflict associated with the selected link/array entry is identified as being an actual SRLG conflict (at step 726), and method 700 proceeds from step 726 to step 728.

At step 728, a determination is made as to whether the final link of the second traversal path has been processed. If a determination is made that the final link of the second traversal path has not been processed, method 700 returns to step 716, at which point the next link of the second traversal path is selected for processing. If a determination is made that the final link of the second traversal path has been processed, processing of the second traversal path is complete and method 700 proceeds to step 730.

At step 730, a determination is made as to whether the final destination node has been processed. As described herein, the method 700 may be performed for all destination nodes associated with a pair of RMTs, a subset of the destination nodes associated with a pair of RMTs, individual destination nodes (e.g., when a new destination node(s) joins the multicast group for receiving multicast traffic via the pair of RMTs) and, thus, this determination may be based on the destination node(s) for which method 700 need to be or may be run. If a determination is made that the final destination node has not been processed, method 700 returns to step 704, at which point a new SRLG array is initialized, and then step 706, at which point the next destination node is selected for processing. If a determination is made that the final destination node has been processed, method 700 proceeds to step 732.

At step 732, method 700 ends.

Although depicted and described as ending, it will be appreciated that processing may continue for performing other functions (e.g., such as where method 700 is used to perform step 508 of method 500, and, thus, processing will continue with step 510 of method 500 for determining local detour path(s) for any potential SRLG conflicts that were identified by method 700 as being actual SRLG conflicts).

Although omitted for purposes of clarity, it will be appreciated that the SRLG array(s), and the associated intermediate results and final results of processing of method 700, may be temporarily and/or permanently stored in any suitable manner. As the method 700 is executed, a list of each potential SRLG conflict that is identified as being an actual SRLG conflict may be stored for subsequent use in determining which, if any, of the potential SRLG conflicts require local detour paths for providing fault-resilient protection for multicast traffic. It will be appreciated that other types of information may be stored as needed and/or desired, and that storage of such information may be performed in any suitable manner. It also will be appreciated that at least a portion of such information also and/or alternatively may be handled in other ways, such as by displaying, transmitting, and/or handling the information in any other suitable manner.

The operation of method 700 may be better understood by considering execution of method 700 for DN $116_1$ of FIG. 3. The SRLG array is initialized to have four entries associated with potential SRLGs $301_1$-$301_4$, respectively. A first traversal path, along first RMT $202_1$, between DN $116_1$ and MSN $112_1$, which includes links $119_{C1}$ and $119_{A1}$, is processed first. The first link $119_{C1}$ of the first traversal path is selected and is determined to be associated with third potential SRLG conflict $301_3$, and, thus, the third entry of the SRLG array associated with third potential SRLG conflict $301_3$ is marked. The second link $119_{A1}$ of the first traversal path is selected and is determined not to be associated with any of potential SRLG conflicts 301. A second traversal path, along second RMT $202_2$, between DN $116_1$ and MSN $112_2$, which includes links $119_{C2}$, $119_{B1}$, and $119_{A4}$, is processed next. The first link $119_{C2}$ of the second traversal path is selected and is determined to be associated with third potential SRLG conflict $301_3$, and, thus, the third entry of the SRLG array associated with third potential SRLG conflict $301_3$ is checked. Here, since the third entry of the SRLG array associated with the third potential SRLG conflict $301_3$ is marked in the array, the third potential SRLG conflict $301_3$ is identified as being an actual SRLG conflict. The second link $119_{B1}$ of the second traversal path is selected and is determined to be associated with second potential SRLG conflict $301_2$, and, thus, the second entry of the SRLG array associated with second potential SRLG conflict $301_2$ is checked. Here, since the second entry of the SRLG array associated with the second potential SRLG conflict $301_2$ is not marked (i.e. it was not marked during processing of the first traversal path), second potential SRLG conflict $301_2$ is not (at least at this point) identified as being an actual SRLG conflict. The third link $119_{A4}$ of the second traversal path is selected and the result is the same as for the processing of the second link $119_{B1}$ of the second traversal path. Thus, although the traversal paths traverse multiple potential SRLG conflicts, only one of the potential SRLG conflicts is identified (at least at this point) as being an actual SRLG conflict.

With respect to FIG. 6 and FIG. 7, as well as associated descriptions of the manner in which RMTs are traversed for identifying which potential SRLG conflicts are actual SRLG conflicts, it will be appreciated that RMTs may be traversed in either direction (i.e., from the destination node toward multicast source nodes or from multicast source node toward the destination node).

Figure 8:
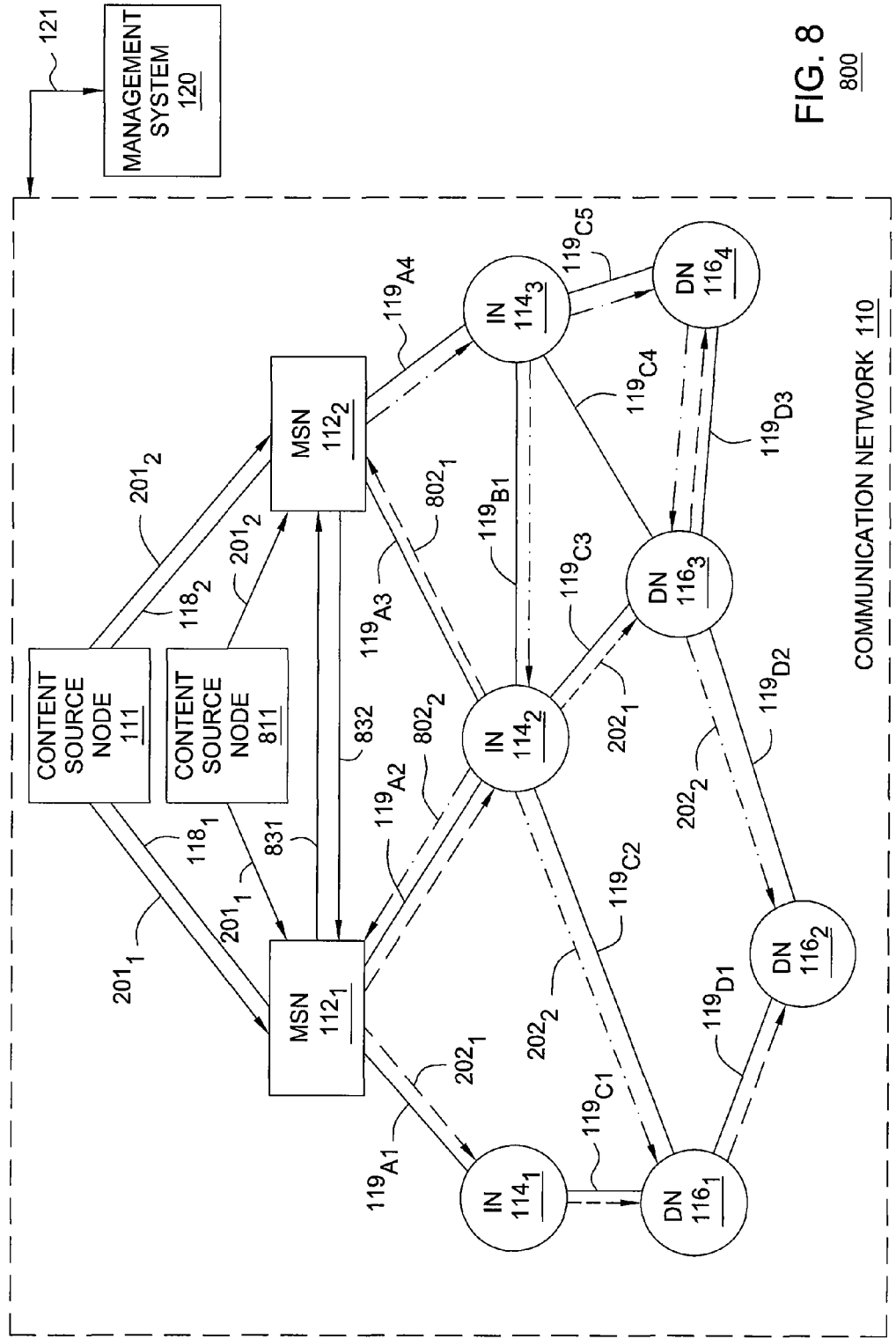
FIG. 8 depicts the communication system of FIG. 1, illustrating additional protection measures which may be employed for protecting against failures of the content source node and/or the multicast source nodes.

FIG. 8 depicts the communication system of FIG. 1, illustrating additional protection measures which may be employed for protecting against failures of the content source node and/or the multicast source nodes.

In one embodiment, resilience against failure of a content server node may be provided by using an additional content source node (CSN) 811 that is connected to MSN $112_1$ and MSN $112_2$. The CSN 111 and CSN 811 each provide the same content stream to both MSN $112_1$ and MSN $112_2$. This provides protection again both failure of CSN 111 (i.e., if CSN 111 fails, MSN $112_1$ and MSN $112_2$ each receive a content stream from CSN 811 and, thus, each of the DNs 116 may still receive the content) and failure of either of the MSNs $112_1$ and $112_2$ (i.e., if either of the MSNs $112_1$ and $112_2$ fails, the other of the MSNs $112_1$ and $112_2$ that does not fail still receives a content stream from one or both of CSN 111 and CSN 811).

In one embodiment, further resilience against failure of a content server node(s) may be provided by connecting MSN $112_1$ and MSN $112_2$ to each other, such that each MSN 112 receives an alternate content feed from the other MSN 112. In this embodiment, MSN $112_1$ is configured to forward the alternate content feed from MSN $112_2$ on first RMT $202_1$ if its content source node (e.g., CSN 111) fails, and, similarly, MSN $112_2$ is configured to forward the alternate content feed from MSN $112_1$ on second RMT $202_2$ if its content source node (e.g., CSN 811) fails. This alternate content feed mechanism may be implemented in any suitable manner. For example, this alternate content feed mechanism may be implemented by establishing two point-to-point (P2P) label switched paths (LSPs) between MSN $112_1$ and MSN $112_2$ (illustratively, P2P LSPs 831 and 832). For example, this alternate content feed mechanism may be implemented by configuring each MSN 112 as a leaf node of the other RMT, i.e., by configuring MSN $112_1$ as a leaf node of the second RMT $202_2$ (as illustrated by the extension $802_2$ to second RMT $202_2$) and configuring MSN $112_2$ as a leaf node of the first RMT $202_1$ (as illustrated by the extension $802_1$ to second RMT $202_1$).

Although primarily depicted and described as separate embodiments, it will be appreciated that various combinations of such protection measures may be employed for providing fault-resilient propagation of multicast traffic.

It will be appreciated that references made herein to source node and destination node are primarily made for purposes of explaining propagation of traffic between nodes, and are not intended to indicate limitations in the capabilities of the nodes to which reference is made. In this manner, labeling of a node as a source node does not preclude the capability of that node to operate as an intermediate node and/or destination node for traffic originating at another node and, similarly, labeling of a node as a destination node does not preclude the capability of that node to operate as a source node and/or intermediate node for providing traffic to one or more other nodes.

Although depicted and described herein with respect to embodiments in which a single configuration (e.g., a pair of RMTs, and one or more associated local detour paths) is used for propagating multicast traffic for a particular content stream, it will be appreciated that a single configuration may be used for propagating multicast traffic for multiple content streams. Although primarily depicted and described with respect to embodiments in which a single configuration (e.g., a pair of RMTs, and one or more associated local detour paths) is determined and implemented within a network, it will be appreciated that multiple such configurations may be implemented for use in propagating multicast traffic within a network.

FIG. 9 depicts a high-level block diagram of a computer suitable for use in performing the functions described herein. As depicted in FIG. 9, computer 900 includes a processor element 902 (e.g., a central processing unit (CPU) or other suitable processor(s)), a memory 904 (e.g., random access memory (RAM), read only memory (ROM), and the like), fault-resilient multicast traffic module/process 905, and various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, a fault-resilient multicast traffic process 905 can be loaded into memory 904 and executed by processor 902 to implement the functions as discussed herein above. Thus, fault-resilient multicast traffic process 905 (including associated data structures) can be stored on a computer readable storage medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing fault-resilient propagation of multicast using Redundant Multicast Trees (RMTs), the method comprising:

identifying each potential Shared Risk Link Group (SRLG) conflict associated with a pair of RMTs providing node-disjoint paths to a plurality of destination nodes, wherein the pair of RMTs comprises a first RMT from a first multicast source node to each of the destination nodes and a second RMT from a second multicast source node to each of the destination nodes, wherein each potential SRLG conflict comprises a plurality of links;

identifying each potential SRLG conflict that is an actual SRLG conflict, wherein a potential SRLG conflict is determined to be an actual SRLG conflict if first and second paths for one of the destination nodes over the respective first and second RMTs each traverse at least one link of the potential SRLG conflict; and for each actual SRLG conflict, determining a detour path for protecting the links of the actual SRLG conflict.

2. The method of claim 1, further comprising:
determining the first RMT and the second RMT.

3. The method of claim 2, wherein the first and second RMTs are determined in a manner for minimizing the number of SRLGs on the first and second RMTs.

4. The method of claim 3, wherein identifying each potential SRLG conflict that is an actual SRLG conflict comprises:

for each of the destination nodes:
traversing a first traversal path, on the first RMT, between the destination node toward the first multicast source node;
traversing a second traversal path, on the second RMT, between the destination node and the second multicast source node; and
if the first and second traversal paths each traverse at least one link associated with the same potential SRLG conflict, identifying the potential SRLG conflict as being an actual SRLG conflict.

5. The method of claim 3, wherein identifying each potential SRLG conflict that is an actual SRLG conflict is performed using an array comprising an entry for each respective potential SRLG conflict, wherein identifying each potential SRLG conflict that is an actual SRLG conflict comprises:

traversing a first traversal path, on the first RMT, between the destination node and the first multicast source node, and for each link of the first traversal path that is associated with a potential SRLG conflict:
identifying the potential SRLG conflict; and
marking the entry in the array that is associated with the identified potential SRLG conflict; and
traversing a second traversal path, on the second RMT, between the destination node and the second source node, and for each link of the second traversal path that is associated with a potential SRLG conflict:
identifying the potential SRLG conflict;
checking the entry in the array that is associated with the identified potential SRLG conflict; and
if the entry in the array is marked, identifying the potential SRLG conflict as being an actual SRLG conflict.

6. The method of claim 1, wherein each detour path is a label switched path (LSP).

7. The method of claim 1, wherein the first and second multicast source nodes each are configured to receive a content stream from a content source node, wherein the first and second multicast source nodes each are configured to multicast the content stream over the first and second RMTs respectively.

8. The method of claim 1, wherein the first RMT includes the second multicast source node and the second RMT includes the first multicast source node.

9. The method of claim 1, further comprising:
generating configuration information for use in establishing the first and second RMTs and the detour path within a network.

10. The method of claim 9, further comprising:
propagating the configuration information toward the network.

11. An apparatus for providing fault-resilient propagation of multicast traffic using Redundant Multicast Trees (RMTs), the apparatus comprising:

a processor and a memory, the processor configured to:
identify each potential Shared Risk Link Group (SRLG) conflict associated with a pair of RMTs providing node-disjoint paths to a plurality of destination nodes, wherein the pair of RMTs comprises a first RMT from a first multicast source node to each of the destination nodes and a second RMT from a second multicast source node to each of the destination nodes, wherein each potential SRLG conflict comprises a plurality of links;
identify each potential SRLG conflict that is an actual SRLG conflict, wherein a potential SRLG conflict is determined to be an actual SRLG conflict if first and second paths for one of the destination nodes over the respective first and second RMTs each traverse at least one link of the potential SRLG conflict; and
determine, for each actual SRLG conflict, a detour path for protecting the links of the actual SRLG conflict.

12. The apparatus of claim 11, wherein the processor is configured to:
determine the first RMT and the second RMT.

13. The apparatus of claim 12, wherein the first and second RMTs are determined in a manner for minimizing the number of SRLGs on the first and second RMTs.

14. The apparatus of claim 13, wherein, for identifying each potential SRLG conflict that is an actual SRLG conflict, the processor is configured to:

perform the following for each of the destination nodes:
traverse a first traversal path, on the first RMT, between the destination node toward the first multicast source node;
traverse a second traversal path, on the second RMT, between the destination node and the second multicast source node; and
if the first and second traversal paths each traverse at least one link associated with the same potential SRLG conflict, identify the potential SRLG conflict as being an actual SRLG conflict.

15. The apparatus of claim 13, wherein the processor is configured to identify each potential SRLG conflict that is an actual SRLG conflict using an array comprising an entry for each respective potential SRLG conflict, wherein, for identifying each potential SRLG conflict that is an actual SRLG conflict, the processor is configured to:

traverse a first traversal path, on the first RMT, between the destination node and the first multicast source node, and for each link of the first traversal path that is associated with a potential SRLG conflict:
identify the potential SRLG conflict; and
mark the entry in the array that is associated with the identified potential SRLG conflict; and traverse a second traversal path, on the second RMT, between the destination node and the second source node, and for each link of the second traversal path that is associated with a potential SRLG conflict:
identify the potential SRLG conflict;
checking check the entry in the array that is associated with the identified potential SRLG conflict; and
if the entry in the array is marked, identify the potential SRLG conflict as being an actual SRLG conflict.

16. The apparatus of claim 11, wherein each detour path is a label switched path (LSP).

17. The apparatus of claim 11, wherein the first and second multicast source nodes each are configured to receive a content stream from a content source node, wherein the first and second multicast source nodes each are configured to multicast the content stream over the first and second RMTs respectively.

18. The apparatus of claim 11, wherein the first RMT includes the second multicast source node and the second RMT includes the first multicast source node.

19. The apparatus of claim 11, wherein the processor is configured to:
generate configuration information for use in establishing the first and second RMTs and the detour path within a network.

20. The apparatus of claim 19, wherein the processor is configured to:
propagate the configuration information toward the network.

21. A non-transitory computer readable medium storing instructions which, when executed by a computer, cause the computer to perform a method for providing fault-resilient propagation of multicast traffic using Redundant Multicast Trees (RMTs), the method comprising:
identifying each potential Shared Risk Link Group (SRLG) conflict associated with a pair of RMTs providing node-disjoint paths to a plurality of destination nodes, wherein the pair of RMTs comprises a first RMT from a first multicast source node to each of the destination nodes and a second RMT from a second multicast source node to each of the destination nodes, wherein each potential SRLG conflict comprises a plurality of links;
identifying each potential SRLG conflict that is an actual SRLG conflict, wherein a potential SRLG conflict is determined to be an actual SRLG conflict if first and second paths for one of the destination nodes over the respective first and second RMTs each traverse at least one link of the potential SRLG conflict; and
for each actual SRLG conflict, determining a detour path for protecting the links of the actual SRLG conflict.

* * * * *